United States Patent
Arzberger et al.

(10) Patent No.: US 7,993,149 B2
(45) Date of Patent: Aug. 9, 2011

(54) HOSE BAND CONNECTOR

(75) Inventors: Maximilian Arzberger, Igenhausen (DE); Christian Herrmann, Altomünster (DE)

(73) Assignee: Bauer Maschinen GmbH, Schrobenhausen (DE)

(*) Notice: Subject to any disclaimer, the term of this patent is extended or adjusted under 35 U.S.C. 154(b) by 0 days.

(21) Appl. No.: 12/588,414

(22) Filed: Oct. 14, 2009

(65) Prior Publication Data

US 2010/0101121 A1   Apr. 29, 2010

(30) Foreign Application Priority Data

Oct. 14, 2008   (EP) .................................. 08017999

(51) Int. Cl.
  *H01R 4/60* (2006.01)
  *E02F 9/22* (2006.01)
(52) U.S. Cl. .......................................... 439/192; 37/347
(58) Field of Classification Search ............. 37/347, 37/348, 466; 439/192–198, 246, 247, 252, 439/181; 219/75, 121.49, 121.51, 121.52, 219/137.63; 285/124.5, 72, 79, 124.3, 124.4, 285/83, 82, 311, 312, 71, 87
See application file for complete search history.

(56) References Cited

U.S. PATENT DOCUMENTS

| 3,673,541 | A | | 6/1972 | Volinskie |
| 5,074,802 | A | * | 12/1991 | Gratziani et al. ............. 439/192 |
| 5,637,006 | A | | 6/1997 | Almeras |
| 6,706,994 | B1 | * | 3/2004 | Sloan ....................... 219/121.51 |
| 7,055,864 | B2 | * | 6/2006 | Pelfrey et al. .............. 285/124.5 |

FOREIGN PATENT DOCUMENTS

| DE | 197818 C | 2/1907 |
| DE | 202005018236 U1 | 1/2006 |
| EP | 0518292 B1 | 12/1992 |
| EP | 0654852 A | 5/1995 |
| EP | 1475344 B1 | 2/2010 |
| FR | 654852 A | 4/1929 |
| RU | 2084747 C1 | 7/1997 |

* cited by examiner

*Primary Examiner* — Robert E Pezzuto
(74) *Attorney, Agent, or Firm* — Jacobson Holman PLLC

(57) ABSTRACT

The invention relates to a hose band connector for connecting hose band elements, which each comprise a plurality of hoses for lines arranged in a band or strip. The hose connector comprises a flange carrier with two connecting sides as well as fixing devices, with which the hoses are flanged to the connecting sides. According to the invention at least one receiving element for a plug-type connection between a first electric line and a second electric line is formed on the flange carrier.

11 Claims, 6 Drawing Sheets

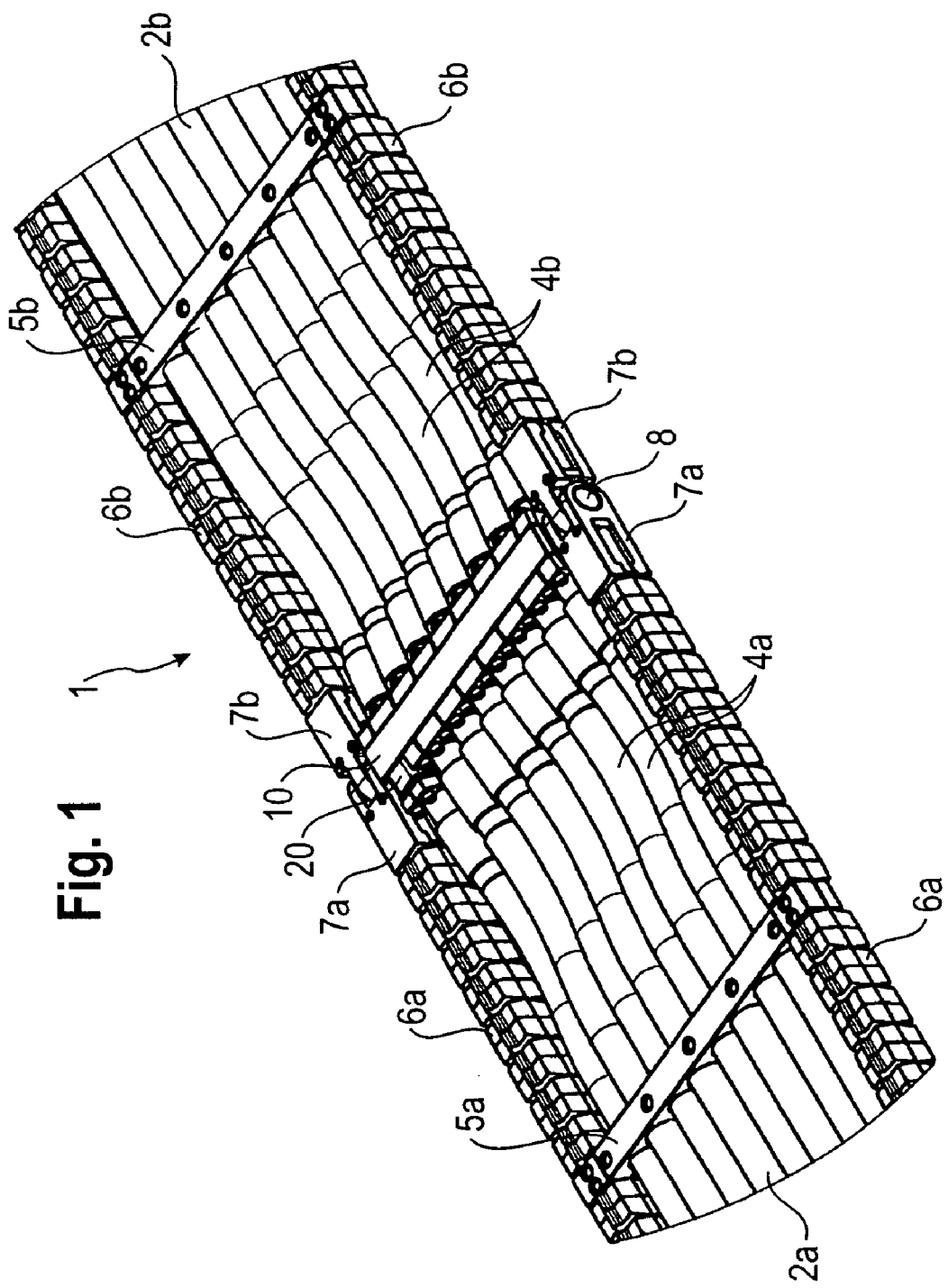

US 7,993,149 B2

HOSE BAND CONNECTOR

BACKGROUND OF THE INVENTION

1. Field of the Invention

The invention relates to a hose band connector for connecting hose band elements which each comprise a plurality of hoses, arranged in bands or strips, for lines.

2. Description of Related Art Including Information Disclosed Under 37 CFR §§1.97 and 1.98

Such hose band connectors comprise a flange carrier which comprises a first connecting side and a second connecting side, between which passages are formed for the line connection, and fixing devices on the first connecting side and the second connecting side for flange connection of the hoses of the hose band elements.

EP 0 518 292 B1 discloses a trench wall cutter with a hose band line, which is constructed from hose band elements by means of generic hose band connectors. The respective connection elements of the fluid line hoses are flanged to the two connecting sides of the strip-form hose band connector.

The band or strip like arrangement of the individual fluid hoses allows even supply of the fluid hoses to the trench wall cutter, whereby undesired deflection of the cutter is avoided through a different operation of the relatively heavy fluid hoses. This is advantageous for exact cutting out of a trench.

In parallel with the hose band, but at a distance from it, other hoses or cables are guided, for example the hose line for removing the cut out earth material as well as the support cable.

It is an object of the invention to improve a hose band connector in such a way that a hose band with improved deployment properties is achieved.

BRIEF SUMMARY OF THE INVENTION

The object is achieved according to the invention by a hose band connector having a flange carrier which comprises a first connecting side and a second connecting side, between which passages are formed for a line connection, and fixing devices on the first connecting side and the second connecting side for flanging the hoses of the hose band elements, wherein at least one receiving element for a plug-type connection between a first electric line and a second electric line is formed on the flange carrier.

The hose band connector according to the invention is characterised in that at least one receiving element for a plug-type connection between a first electric line and a second electric line is formed on the flange carrier. It is hereby possible to also arrange electric lines in the hose band as well as simultaneously being possible to exchange a hose band element with the electric line in case of damage to the electric line without rolling out the whole hose lines.

Up to now electric lines have been constantly arranged as a continuous line between a trench wall cutter and a base device, on account of the low weight and the relatively favourable costs. In case of damage the whole line system of the cutter had to be rolled out over the whole length in order to change the electric line. This is time-consuming and leads to a correspondingly long down time of the cutter.

The arrangement according to the invention allows an electric line to now be directly integrated into the hose band. The risk of damage is hereby reduced. It also continues to be possible to change hose band elements in segments in case of damage to either a fluid hose or the electric line.

The term "electric line" according to the invention is understood to mean not only lines for electric power supply but also data lines or combinations thereof. All in all, the term "electric line" also includes other lines, for example optical waveguides or glass fibre cables, or also other data and power supply lines with a plug-type connection.

It is preferable according to the invention for the receiving element to be designed to receive a plug of the first electric line and a mating plug of the second electric line. The receiving element can in particular be a bore or other receiving area in the strip-form flange carrier. The receiving element can in principle itself comprise plug-type devices, so that the corresponding plugs of the electric lines to be connected can be directly inserted. However, the receiving element preferably constitutes a receiving area, in which a plug and a mating plug, which are each fixedly connected to the electric lines, can be received. In case of dismantling, the plug and the mating plug thus remain directly on the electric lines. The plugs can be formed as coaxial plugs, flat band plugs or otherwise.

In order to produce or release the plug-type connection it is advantageous according to the invention that a cover member is provided on the flange carrier, which can be moved between a closed position, in which the electric plug-type connection is covered, and a released position, in which the plug-type connection is exposed.

It is thereby preferable according to the invention that the plug-type connection comprises a clamping nut for connecting the plug and the mating plug, whereby the clamping nut can be actuated in the released position of the cover member. A clamping nut is a usual and reliable connection and securing element for cylindrical or essentially rotationally symmetrical power and data lines. For this purpose, an outer thread is provided on a connection element and can be brought into engagement with the clamping nut arranged on the other connection element. A clamping nut is sensible particularly with a plug-type connection, for which an axial plug movement is necessary for producing and releasing the plug-type connection.

A particularly compact design of the invention is produced in that the sliding member comprises a sleeve with an annular collar and the cover member is mounted so as to be displaceable in a recess in the flange carrier. The cover member can thus be pushed as a sliding member in the released position into the flange carrier, while through withdrawal from the flange carrier the sliding member reaches the closed position, in which the sliding member surrounds the electric plug-type connection and thus covers it in a radially outward direction.

It is thereby provided according to the invention that the cover member is held in the closed position by a spacer which is arranged between the flange carrier and the annular collar. The spacer can in particular be a split ring which surrounds and additionally protects the cover member in the closed position. The fixing can be realised on the flange carrier through the collar of the cover member and through the spacer.

It is thereby particularly advantageous that a fixing device for an electric line is provided on the cover member. In this way, mechanical fixing of the electric line to the flange carrier can be realised. Additional stability is hereby achieved for the electric line.

A particularly advantageous development of the invention results from the fixing device for the electric line corresponding to the fixing device for the hoses for fluid lines. The fixing devices are designed in particular to support standard flange elements, so-called SAE flanges. For this purpose the fixing devices are formed as corresponding bores with internal threads. The flange elements are in particular half ring shaped fixing elements which surround corresponding connection elements on the lines and hoses. Through the same design of the fixing devices their production is simplified and the same fixing elements can be used irrespectively of whether lines or hoses are used.

According to the invention a hose band is further provided comprising at least two hose band elements with a plurality of hoses arranged in a band or strip, in which the hose band elements are connected to each other with a hose band connector, in which the hose band connectors correspond to the previously described hose band connectors according to the invention, in which at least a first electric line and a second electric line are provided, which are connected to each other by means of a plug-type connection, and the plug-type connection is arranged in a receiving element on the flange carrier.

It is further preferred according to the invention that the hoses for fluid lines each have connection elements at their ends which can be fixed with flange elements on the flange carrier. The connection elements can in particular be collar-like elements which are engaged in a shape-locking way by annular or partial ring shaped flange elements. The flange connection can then be carried out in the known way by corresponding fixing screws in threaded bores on the flange carrier.

A particularly robust arrangement is produced according to the invention in that at least one electric line is surrounded by a hose with a connection element which can be fixed with a flange element. The actual electric line can be provided in particular in a hose which corresponds to a fluid hose. The shell of the hose thus constitutes an additional protection for the electric cable against damage, which is advantageous in particular when using construction equipment, in particular with trench wall cutters.

BRIEF DESCRIPTION OF THE SEVERAL VIEWS OF THE DRAWINGS

The invention is described below by reference to preferred embodiments which are shown schematically in the attached drawings, in which:

FIG. 1 shows a perspective partial view of a hose band according to the invention;

DETAILED DESCRIPTION OF THE INVENTION

Figure 2:
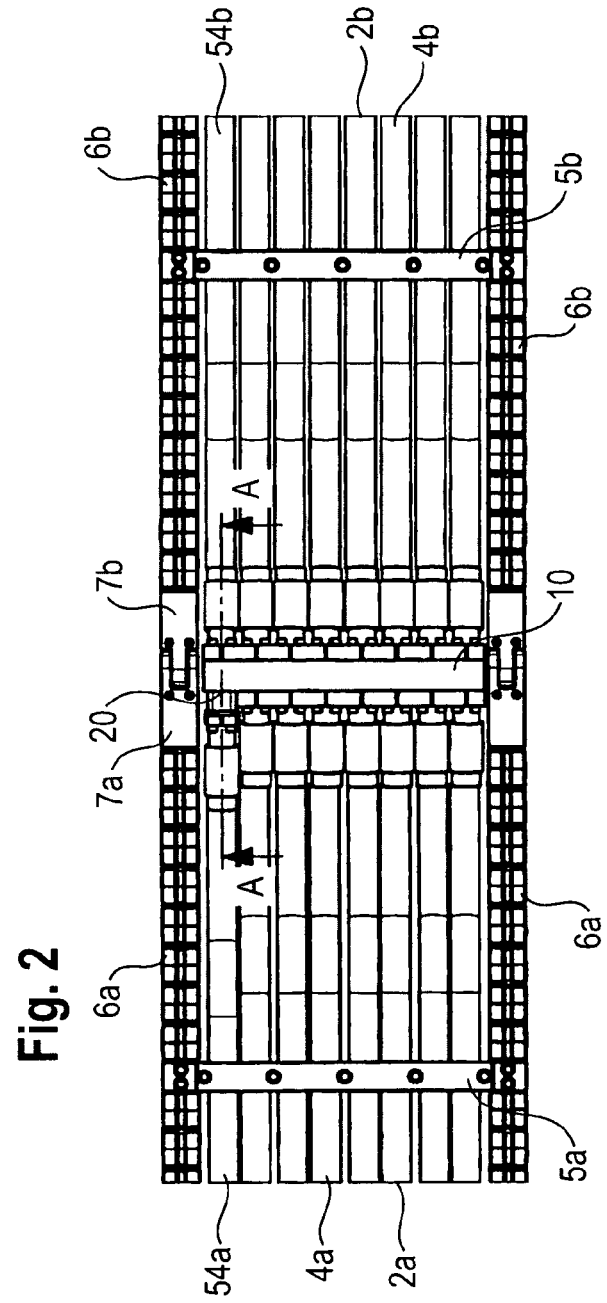
FIG. 2 shows a top view of the hose band according to the invention according to FIG. 1.

According to FIGS. 1 and 2, a hose band 1 according to the invention is formed from at least two hose band elements 2a, 2b, which each comprise a plurality of hoses 4a, 4b arranged one beside the other. The hoses 4a, 4b, arranged in a band or a strip, for conveying a fluid, in particular a hydraulic fluid, are arranged fixed at regular distances from each other via transverse webs 5a, 5b. On both sides of the strip arrangement of the hoses 4a, 4b, chain-like lateral guides 6a, 6b are provided. These consist in the known way of block-form guide elements with upwardly orientated nose elements and corresponding recesses on their lower side. The recesses on the lower side cannot be seen in FIG. 1. The chain-like lateral guides 6a, 6b allow guided rolling, whereby the individual blocks serve as spacers and thus prevent crushing of the hoses 4a, 4b.

The two hose band elements 2a, 2b are connected to each other via a hose band connector 10 according to the invention. The ends of the respective hoses 4a, 4b of the two hose band elements 2a, 2b are flanged in a releasable way to connecting sides of a strip-form flange carrier 12 of the hose band connector 10.

The lateral guides 6a, 6b of the two hose band elements 2a, 2b are also connected to each other in a jointed way in the region of the hose band connector 10 via known connection members 7a, 7b by means of a connecting bolt 8. In this way a hose band 1 according to the invention can be constructed from a plurality of hose band elements 2. In case of damage it is possible to merely remove the damaged hose band element 2 and to exchange it for a replacement hose band element 2.

According to the invention a receiving element 20 or a connecting device is provided on the hose band connector 10 for a plug-type connection for a power or data line, as can be seen from FIG. 2.

As can be seen from the illustration according to FIGS. 1 and 2, the hose band comprises a total of eight hose lines, whereby seven hose lines are provided with the hoses 4a, 4b for hydraulic fluid, while a hose 54a, 54b shown at the top of FIG. 2 is designed to receive an electric line. In this connection, unlike the hoses 4a, 4b for the fluid, the receiving element 20 is formed on the flange carrier 12, which can be seen in greater detail from the enlarged sectional view of FIG. 3.

A first connecting side 14 and an opposing second connecting side 16 are formed on the strip-form, prism-like flange carrier 12, on which first and second connecting sides 14 and 16 the hose lines are flanged. By means of corresponding passages or through channels the opposing hoses 4a, 4b are in line connection. Thereby the receiving hoses 54a, 54b with the connection elements 42a, 42b, which are provided for the electric line, are formed in the same way as the hoses 4a, 4b for the fluid lines. Correspondingly, the same flange elements 46a, 46b, which constitute standard SAE flange elements, are used for fixing the hose.

A receiving element 20 is formed on the flange carrier 12 to receive a plug-type connection 50 for the electric lines, whereby a spacer 30 comprising two annular elements is provided.

Figure 3:
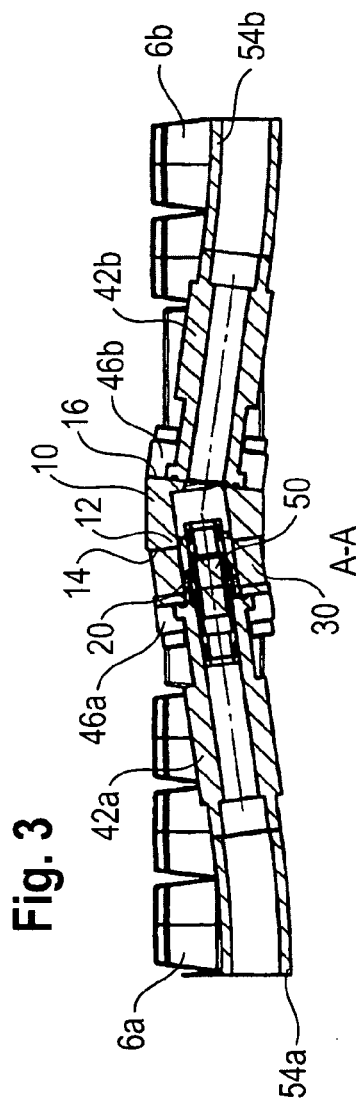
FIG. 3 shows an enlarged cross-sectional along A-A of FIG. 2.
Figure 4:
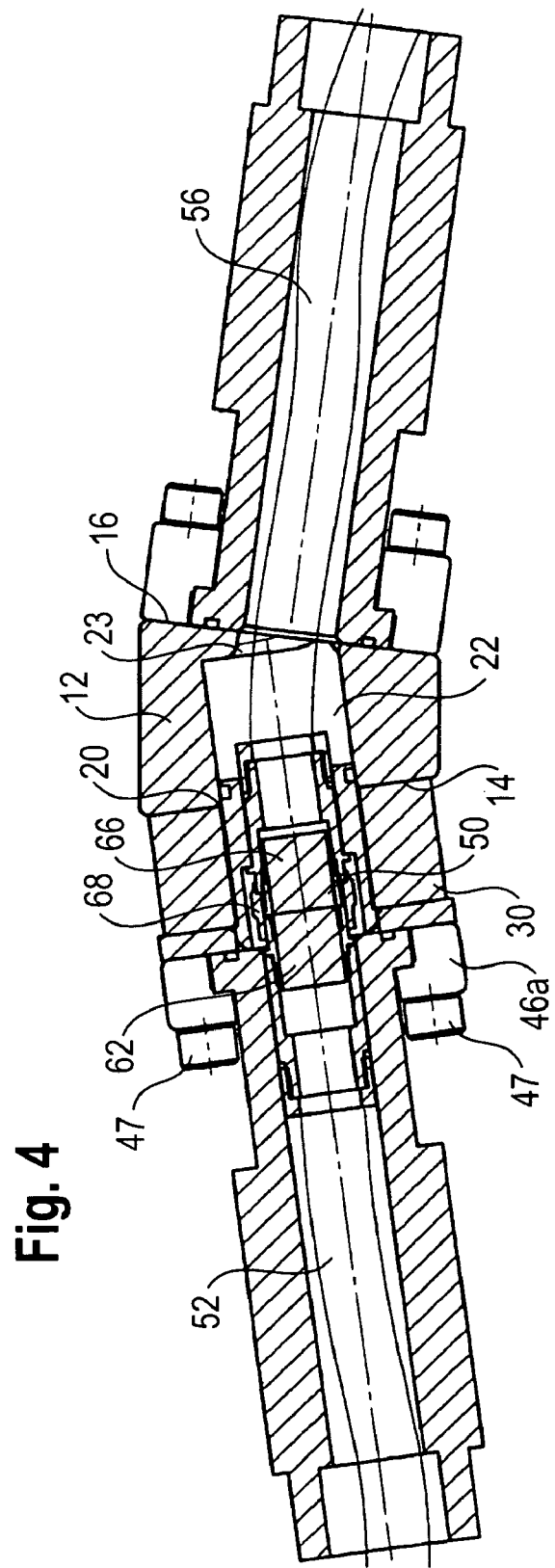
FIG. 4 shows an enlarged cross-sectional view of a hose band connector according to the invention with a closed electric line.

The arrangement of FIG. 3 is shown in a further enlarged representation in FIG. 4, whereby the first electric line 52 and the second electric line 56 are also shown. The illustration of FIG. 4 shows the plug-type connection 50 in a closed state, in which an electric line connection is produced between the first electric line 52 and the second electric line 56.

It can be seen in particular from FIG. 4 that for the formation of the receiving element 20 for the electric plug-type connection 50, the flange carrier 12 is formed asymmetrically unlike in the case of the connection of the hoses 4a, 4b for the fluid lines. A recess 22 opens towards the first connecting side 14, said recess 22 running into a passage 23 with a smaller diameter to the second connecting side 16.

In order to release the plug-type connection 50, connecting screws 47 are loosened on the first connecting side 14 of the flange carrier 12 and removed, so that the partial ring shaped flange elements 46a can be loosened on the first connecting side 14 and removed. As the fixing screws 47 extend into the threaded bores (not shown) in the flange carrier 12, the annular spacer 30, which is formed from two half ring elements, can now also be removed.

Figure 5:
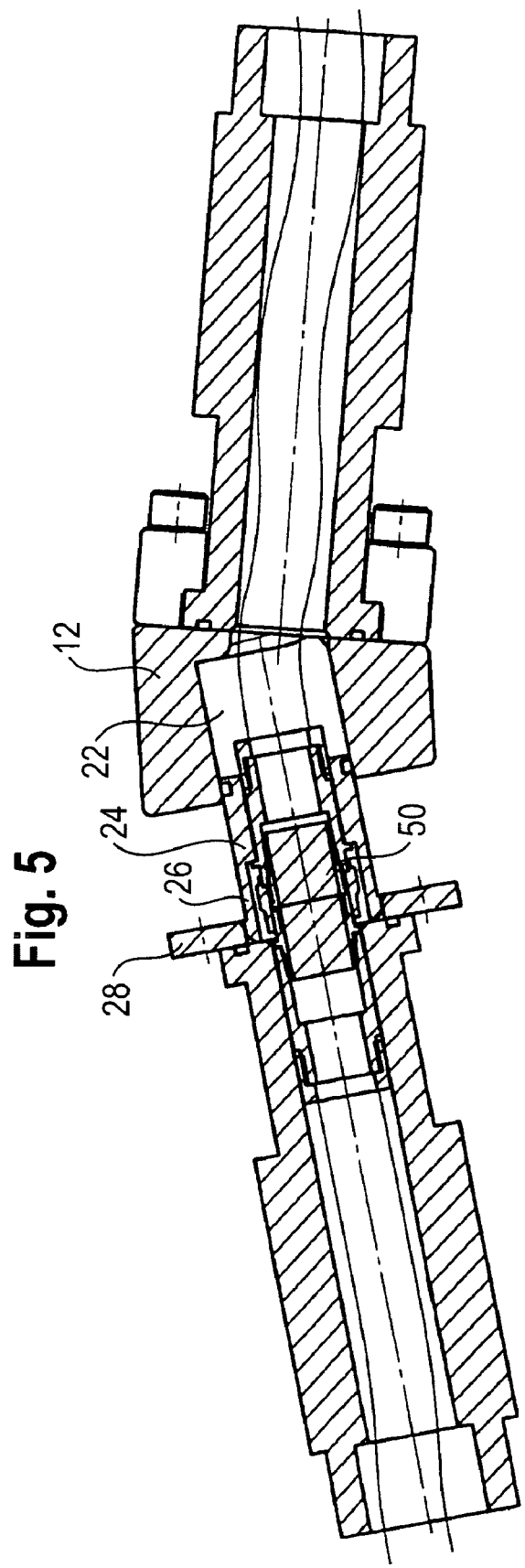
FIG. 5 shows the arrangement according to FIG. 4 with the spacer removed.

The state shown in FIG. 5 is thus reached. In this state the plug-type connection 50 is further surrounded by a cover member 24 which comprises a sleeve 26 with an outwardly projecting annular collar 28. The cover member 24 can be pushed back out of this closed position into a bore or recess 22 in the flange carrier 12.

Figure 6:
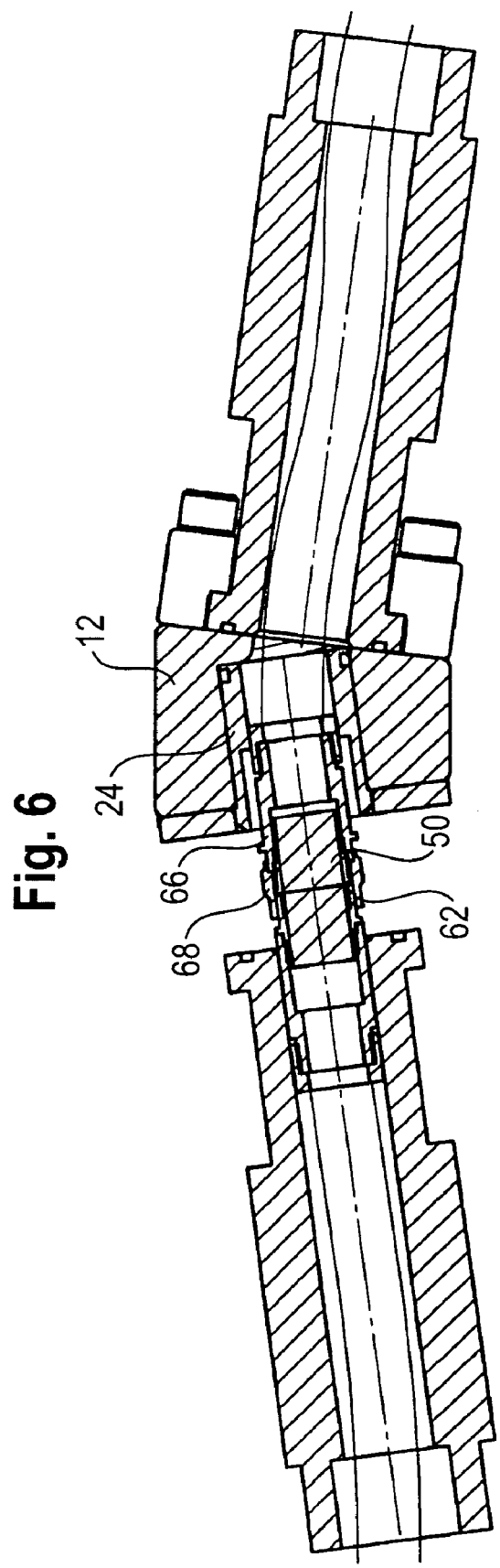
FIG. 6 shows the arrangement of FIGS. 4 and 5 with the cover member withdrawn.
Figure 7:
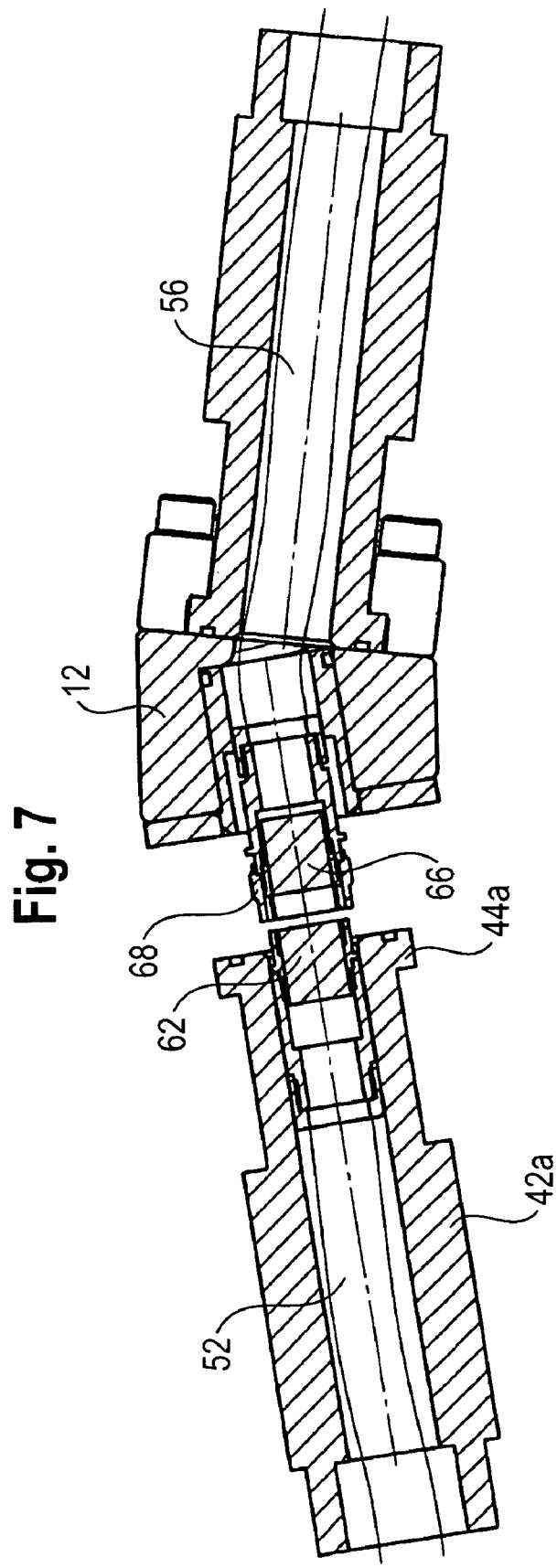
FIG. 7 shows the arrangement of FIGS. 4 to 6 with the plug-type connection released.

The thus reached released position is shown in FIG. 6. In this released position the clamping nut 68 of the plug-type connection 50 is freely accessible and can be actuated by hand or with an appropriate tool. By a corresponding rotation movement, the tubular clamping nut 68 with an internal thread is released from an external thread on the plug 62 and displaced towards the flange carrier 12 on the mating plug 66.

After the screw connection of the clamping nut 68 has been released, the plug 62 can now be axially pulled out of the mating plug 66, so that the connection is interrupted between the first electric line 52 and the second electric line 56. Depending upon which line element is to be exchanged, it is possible to either remove the first electric line 52 from the connection element 42a or to pull the mating plug 66 with the second electric line 56 out of the flange carrier 12. Closure of the electric plug-type connection 50 is realised in a correspondingly opposite manner until the connection element 42a is screwed again with the flange elements 46 and the fixing screws 47 on the flange carrier 12, whereby the flange elements 46 engage in a shape-locking way around a corresponding annular shoulder 44a on the connection element 42a.

The invention claimed is:

1. Hose band connector for connecting first and second hose band elements, each hose band element including a plurality of fluid hoses for carrying a fluid and at least one electric line hose for carrying an electric line, wherein the fluid hoses and the at least one electric line hose are arranged in a band, the hose band connector comprising:
   a flange carrier having a first connecting side, a second connecting side, and passages formed between the first and second connecting sides for respectively receiving the plurality of fluid hoses and the at least one electric line hose of the first and second hose band elements in line connection with each other,
   fixing devices on the first connecting side and the second connecting side for flanging the at least one electric line hose and the plurality of fluid hoses of the first and second hose band elements, respectively, to the flange carrier,
   at least one receiving element formed on the flange carrier and configured for an electric plug-type connection between the at least one electric line hose of the first and second hose band elements, and
   a cover member provided on the flange carrier, the cover member being movable between a closed position, in which the electric plug-type connection is covered, and a released position, in which the electric plug-type connection is accessible.

2. Hose band connector according to claim 1, wherein
   the at least one electric line hose of one of the first and second hose bands has a plug at one end thereof and the at least one electric line hose of the other of the first and second hose bands has a mating plug at one end thereof, and the receiving element is configured to receive the plug and the mating plug.

3. Hose band connector according to claim 2, wherein
   the electric plug-type connection comprises a clamping nut for connecting the plug and the mating plug, whereby the clamping nut can be actuated in the released position of the cover member.

4. Hose band connector according to claim 1, wherein
   the cover member comprises a sleeve with an annular collar and
   the cover member is mounted so as to be displaceable in a recess in the flange carrier.

5. Hose band connector according to claim 4, wherein
   the cover member is held in the closed position by a spacer which is arranged between the flange carrier and the annular collar.

6. Hose band connector according to claim 1, wherein
   a fixing device for an electric line is provided on the cover member.

7. Hose band connector according to claim 6, wherein
   the fixing device for an electric line corresponds to the fixing device for the fluid and electric line hoses.

8. Hose band comprising
   at least first and second hose band elements, each hose band element including a plurality of fluid hoses for carrying a fluid and at least one electric line hose for carrying an electric line, wherein the fluid hoses and the at least one electric line hose are arranged in a band: and
   a hose band connector according to claim 1, wherein the first and second hose band elements are connected together by the hose band connector
   wherein the at least one electric line hose of the first and second hose band elements are connected to each other via the electric plug-type connection, and
   the plug-type connection is arranged in the receiving element on the flange carrier.

9. Hose band according to claim 8, wherein
   flange elements are provided on the flange carrier, and the fluid and electric line hoses each have connection elements at their ends which can be fixed with flange elements on the flange carrier.

10. Hose band according to claim 9, wherein
    the at least first and second hose band elements include at least one electric line, wherein each electric line is surrounded by an electric line hose, and wherein the at least one electric line hose includes a connection element which is fixable with a flange element.

11. A trench wall cutter, wherein
    a hose band is provided according to claim 8.

* * * * *